No. 873,458. PATENTED DEC. 10, 1907.
W. REEVES & B. BRAMWELL.
APPARATUS FOR FILTERING LIQUIDS.
APPLICATION FILED NOV. 23, 1904.
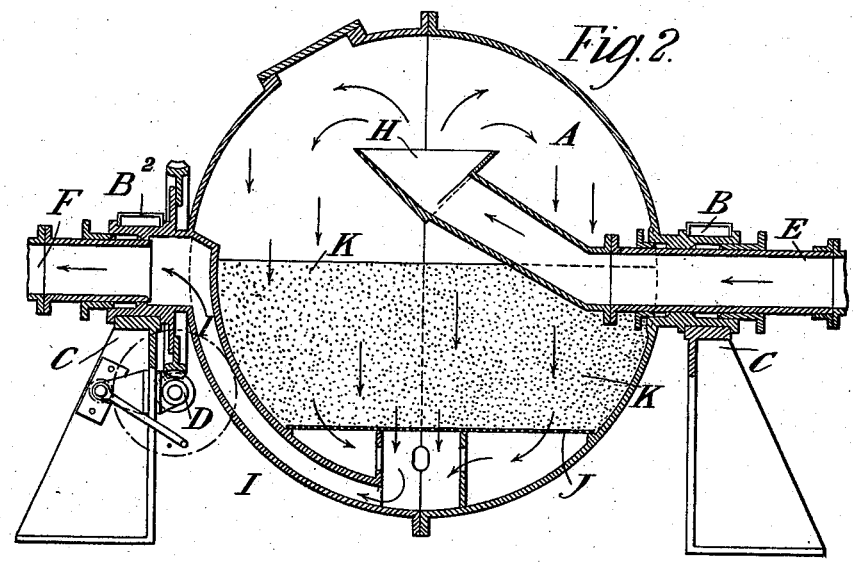
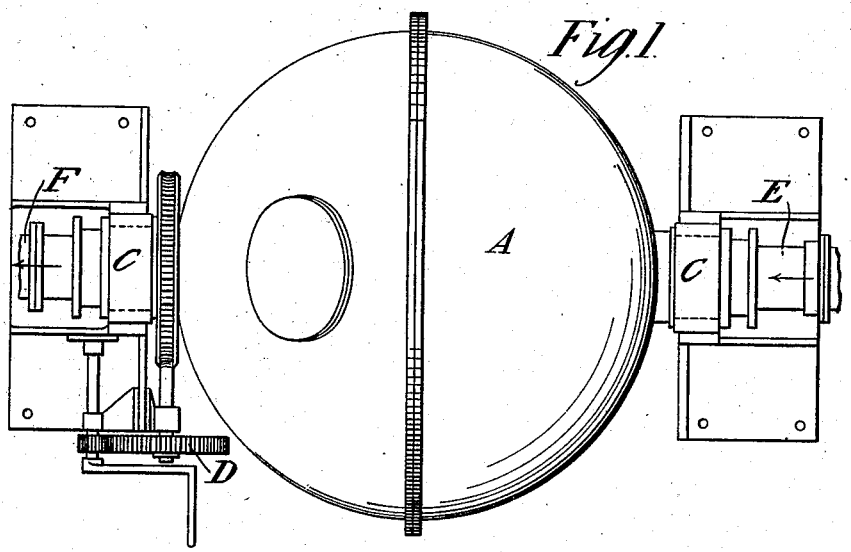

UNITED STATES PATENT OFFICE.

WILFRED REEVES AND BALFOUR BRAMWELL, OF WELLINGTON PLACE, COUNTY OF BELFAST, IRELAND.

APPARATUS FOR FILTERING LIQUIDS.

No. 873,458.        Specification of Letters Patent.        Patented Dec. 10, 1907.

Application filed November 23, 1904. Serial No. 234,003.

*To all whom it may concern:*

Be it known that we, WILFRED REEVES and BALFOUR BRAMWELL, both subjects of the King of England, residing at 23 "Kingscourt," Wellington Place, in the county of Belfast, Ireland, consulting engineers, have invented certain new and useful Improvements in and Connected with Apparatus for Filtering Liquids, of which the following is a specification.

This invention relates to apparatus for filtering liquids and is designed for the removal chiefly of solid impurities held in suspension in impure water or other liquids, and consists in an improved construction to be hereinafter described, by means of which the separation of such matter from the filtrate and the subsequent removal of the impurities from the material of the filter bed may be conveniently and expeditiously accomplished.

The improved apparatus is illustrated in the accompanying drawings, in which

Figure 1 is a plan view and Fig. 2 a vertical longitudinal section.

A spherical, or spherical-ended chamber A is provided with hollow trunnions B, B², which are diametrically opposite each other and are supported in suitable bearings C at a sufficient height above the ground to enable the chamber A to be revolved about the axis of its trunnions by any suitable means, as by the crank and worm gearing D.

A fixed pipe E, having suitable valves (not shown in the drawings) for controlling the admission or emission of liquids, passes from the outside through the hollow trunnion B, which is preferably as shown in Fig. 2, formed with stuffing boxes provided with packing glands by means of which a liquid-tight joint is secured, and projects upwards into the chamber A, terminating at a suitable height in an upwardly turned bell-mouthed end H. On the opposite side of the chamber A and outside of it, is a second fixed pipe F, which has similar valves to the pipe E and enters the trunnion B² without passing through it, into the chamber A, a stuffing box and gland being provided to prevent leakage between the trunnion and the pipe.

A perforated floor J, supports a filter bed of suitable material K, and from the lower side of the floor J extends a pipe or passage I formed with or secured to the wall of the chamber A and communicating with the interior of the trunnion B².

The liquid to be filtered enters the inlet pipe E and is distributed by the bell-mouthed delivery end H over the surface of the filter bed K, through which it passes to the pipe I and thence by the trunnion B² to the outlet pipe F. The curved walls of the filter chamber tend to prevent the "creeping" of unfiltered liquid downwards between the walls and the filter bed.

When the filter bed has become foul it is cleansed either by causing a reverse flow of pure water or other cleansing liquid from the pipe F to the pipe E, while the chamber A is revolved so as to turn over the filter bed, or else the filter bed is submerged in the cleansing liquid, the valves of both the pipes E, F, being closed, and the chamber A revolved by means of the turning gear D. As the chamber A is revolved, the material of the filter bed K falls through the cleansing liquid, each particle being thus scoured and washed. When this process has been continued for sufficient time, the fouled liquid in the chamber is displaced by causing a reverse flow of pure water or other cleansing liquid, after which the filtration may be resumed.

Having thus described this invention and the best means we know of carrying the same into practical effect, we claim:—

1. Apparatus for filtering liquids comprising a spherical ended casing revolubly mounted on hollow trunnions integral with and opening directly into said casing, the axis of said trunnions being disposed at right angles to the axis of the spherical ends of the casing, a permanently fixed inlet pipe passing through one of the said trunnions into, extending upwardly within, the said casing and terminating in an upwardly directed open bell-mouthed end, a filter bed contained entirely in the lower spherical part of the said casing having spherical walls and a perforated floor, a collecting chamber located below and supporting the said floor, a passage within the casing leading from the said collecting chamber to the second trunnion, and a fixed outlet pipe leading from the said trunnion; substantially as described.

2. In apparatus of the character herein described, a spherical ended casing revolubly mounted on hollow trunnions and constructed in two sections divided on a plane normal to the axis of said trunnions, a permanently fixed inlet pipe passing through one of the said trunnions into the said casing, an upwardly inclined extension of said inlet pipe terminating in an upwardly directed open bell mouth, a fixed outlet pipe leading from the second trunnion, and means for revolving the casing; substantially as described.

In testimony whereof we have signed our names to this specification in the presence of two subscribing witnesses.

WILFRED REEVES.
    BALFOUR BRAMWELL.

Witnesses:
 SAML. McCULLOUGH,
 THOMAS STUART.